United States Patent
Agner

(10) Patent No.: US 9,080,636 B2
(45) Date of Patent: Jul. 14, 2015

(54) DUAL CLUTCH WITH TORSIONAL VIBRATION DAMPER

(75) Inventor: Ivo Agner, Buehl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 388 days.

(21) Appl. No.: 12/999,122

(22) PCT Filed: Jun. 8, 2009

(86) PCT No.: PCT/DE2009/000793
§ 371 (c)(1),
(2), (4) Date: Dec. 15, 2010

(87) PCT Pub. No.: WO2009/152799
PCT Pub. Date: Dec. 23, 2009

(65) Prior Publication Data
US 2011/0088989 A1    Apr. 21, 2011

(30) Foreign Application Priority Data

Jun. 16, 2008   (DE) .......................... 10 2008 028 235
Jul. 28, 2008   (DE) .......................... 10 2008 035 146
Mar. 9, 2009    (DE) .......................... 10 2009 011 768

(51) Int. Cl.
*F16D 3/66*      (2006.01)
*F16F 15/14*     (2006.01)
*F16D 3/12*      (2006.01)
*F16D 21/06*     (2006.01)
*F16D 25/10*     (2006.01)
*F16F 15/123*    (2006.01)

(52) U.S. Cl.
CPC ................ *F16F 15/145* (2013.01); *F16D 3/12* (2013.01); *F16D 3/66* (2013.01); *F16D 21/06* (2013.01); *F16D 25/10* (2013.01); *F16F 15/123* (2013.01); *F16D 2021/0607* (2013.01); *F16D 2021/0661* (2013.01); *Y02T 10/76* (2013.01)

(58) Field of Classification Search
USPC ................. 192/48.619, 48.1, 48.603, 48.604, 192/48.616, 66.32, 84.91, 70.17
See application file for complete search history.

(56) References Cited

U.S. PATENT DOCUMENTS

| | | | |
|---|---|---|---|
| 6,050,380 A * | 4/2000 | Peinemann et al. ......... | 192/55.4 |
| 7,485,066 B2 * | 2/2009 | Bailey et al. .................. | 475/269 |
| 2005/0279604 A1 * | 12/2005 | Vetter et al. .................. | 192/48.8 |
| 2009/0194383 A1 * | 8/2009 | Fronius et al. ............. | 192/87.11 |

FOREIGN PATENT DOCUMENTS

| | | |
|---|---|---|
| DE | 198 04 227 A1 | 8/1999 |
| DE | 100 34 730 A1 | 8/2001 |
| DE | 102 24 874 A1 | 12/2002 |
| DE | 10 2004 004 176 A1 | 8/2005 |
| EP | 1 744 074 A | 1/2007 |
| EP | 1 780 434 A | 5/2007 |
| EP | 1 865 222 A | 12/2007 |

* cited by examiner

*Primary Examiner* — Robert Hodge
*Assistant Examiner* — Stacey Fluhart
(74) *Attorney, Agent, or Firm* — Lucas & Mercanti, LLP

(57) ABSTRACT

A dual wet clutch in a closed housing. A damper is arranged in the power flow from the housing to the input parts of the wet clutches. The input parts are connected to one another substantially without play. Furthermore, a centrifugal force pendulum is arranged on at least one input part. The arrangement has a particularly short axial structural length.

11 Claims, 3 Drawing Sheets

DUAL CLUTCH WITH TORSIONAL VIBRATION DAMPER

Figure 1:
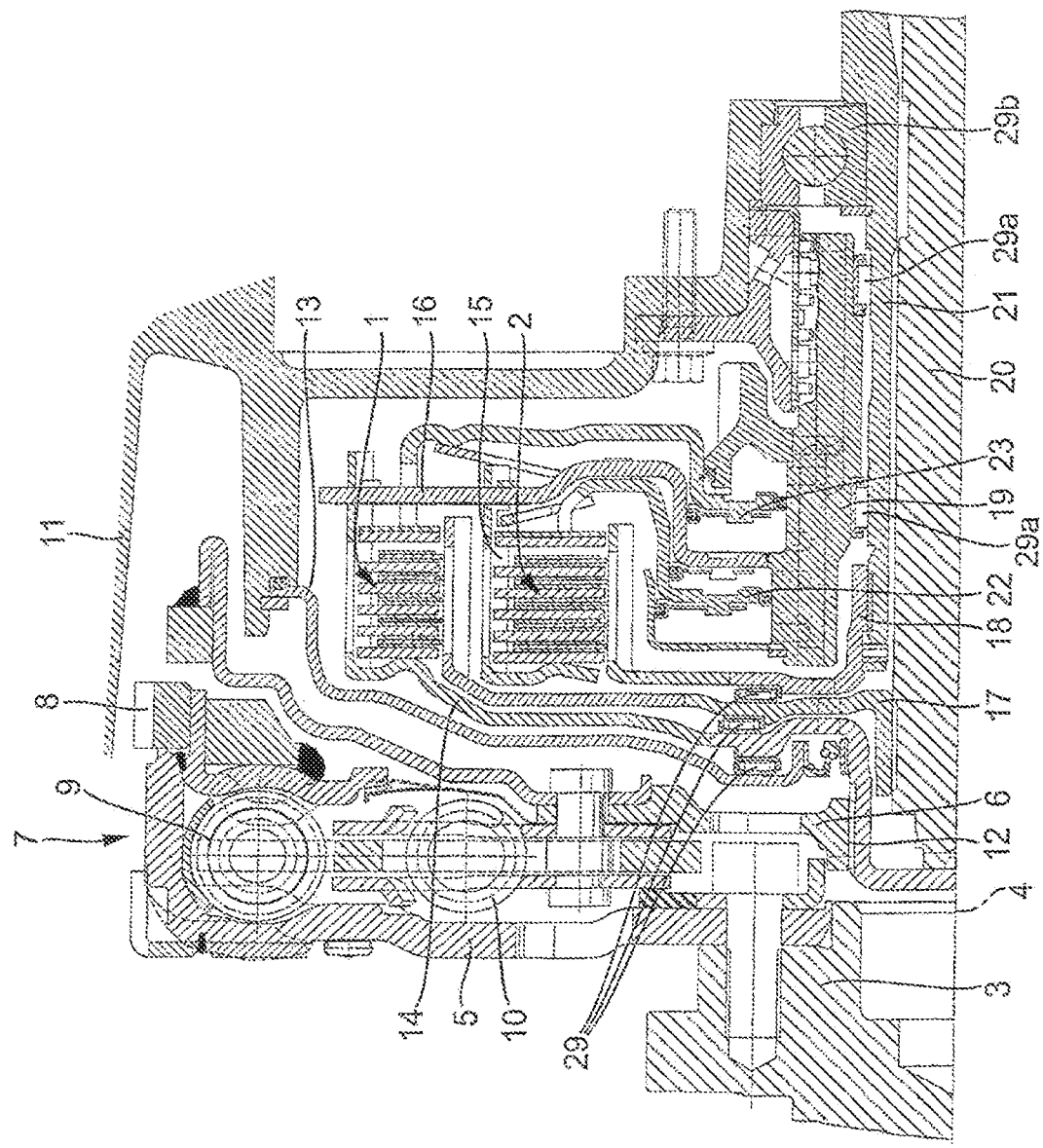

This application is a 371 of PCT/DE2009/000793 filed Jun. 8, 2009, which in turn claims the priority of DE 10 2008 028 235.9 filed Jun. 16, 2008, DE 10 2008 035 146.6 filed Jul. 28, 2008, and DE 10 2009 011 768.7 filed Mar. 9, 2009, the priority of these applications is hereby claimed and these applications are incorporated by reference herein.

The invention relates to a dual clutch with two wet clutches arranged in a wet space and with a torsional vibration damper.

Dual clutches are known for motor vehicles. They can be designed as dual clutches with two wet clutches nested radially one above the other, which are operated in a closed wet space, which is filled with a fluid such as hydraulic oil or the like. Torsional vibration dampers for damping torsional vibrations, which are introduced into the drive train especially by internal combustion engines such as high-torque diesel engines, can furthermore be provided in the wet space. The worse the lack of smoothness of the internal combustion engine, the larger the dimensions of the torsional vibration dampers, such as dual mass flywheels, must be in this case, and there is a resulting increase in the axial installation space for the dual clutch owing to the torsional vibration damper, which is arranged axially adjacent to the wet clutches. Especially when using a plurality of damping systems arranged radially one above the other, there is a conflict in terms of installation space between the radially inner damping system and the wet clutches, which extend axially in this area.

It is therefore the object of the invention to propose a dual clutch which requires less axial installation space. In particular, the intention is to make the dual clutch compact through a shared use of components by the wet clutches and the torsional vibration damper.

The invention is achieved by means of a dual clutch for motor vehicles having the following features:
- the dual clutch has an oiltight housing;
- the housing is connected in a rotationally fixed manner to the crankshaft of an internal combustion engine;
- at least one torsional vibration damper, two wet clutches and a centrifugal pendulum are arranged in the housing;
- the wet clutches each have an input part and an output part;
- the input parts of the wet clutches are connected to one another;
- the output parts of the wet clutches are connected to transmission input shafts;
- a torsional vibration damper is arranged in the power flow from the housing to the input parts of the wet clutches, the input part of said damper being connected to the housing, and the output part of the torsional vibration damper being connected to the input parts of the wet clutches;
- a centrifugal pendulum is arranged on one of the input parts of the wet clutches.

According to the inventive concept, the torsional vibration damper is integrated into the wet clutch in such a way that there is shared use of components of the wet clutches and of the torsional vibration damper which take up axial installation space. Thus, there can be shared use of the input part of one or both wet clutches and the output part to the extent that the output part of the torsional vibration damper does not require any additional axial installation space. As an alternative or in addition, an outer damping system can be arranged radially on the outside of the wet clutches, with the result that only the input part of the torsional vibration damper requires additional axial installation space. It is particularly advantageous that said input part can simultaneously form a housing wall of the housing. If a two-stage torsional vibration damper with an inner or outer damping system is required, one of the damping systems can be replaced by a centrifugal pendulum, which is of narrower construction axially than a damper stage having axially projecting energy storage devices with helical springs.

The torsional vibration damper and the centrifugal pendulum are advantageously arranged substantially on the same diameter and axially in series. It is thereby possible, especially by way of the centrifugal pendulum that can be arranged parallel to the torsional vibration damper, to propose a particularly advantageous, axially narrow dual clutch which is defined substantially by the axial installation space for the two wet clutches. The arrangement of the wet clutches radially within the torsional vibration damper and the centrifugal pendulum necessitates arrangement of the friction linings on a smaller diameter for a given radial installation space. A resulting reduction in a maximum torque that can be transmitted via the wet clutches can be more than compensated for by insertion of an axially narrow friction plate into the friction clutches, compared with the gain in axial installation space with the arrangement of the torsional vibration damper radially on the outside of the wet clutch.

The torsional vibration damper can be designed as a dual mass flywheel with a primary mass assigned to the input part and a secondary mass assigned to the output part, it being possible to arrange arcuate springs extending over a wide area of the torsional vibration damper between the input and output parts. To protect the unhardened outer shell of the housing from wear due to the arcuate springs, which require support owing to centrifugal force, a hardened sliding shell, in which the arcuate springs slide with lubrication by the fluid contained in the housing, can be arranged between said arcuate springs and the housing.

According to an inventive concept, the housing can be provided with a connecting element which drives an oil feed pump in a transmission arranged axially in series. An oil feed pump of this kind, combined if appropriate with a pressure reservoir, can bring about the operation of the wet clutches, the shifting of the transmission, circulation of the fluid volume in the housing and/or the like.

In an advantageous embodiment, circulation can be accomplished without a pump by arranging a scoop tube radially on the outside within the housing, said scoop tube feeding heated fluid contained in the housing to a cooling circuit, which can contain a cooler, arranged outside the housing. The fluid, such as hydraulic oil or the like, propelled outward by centrifugal force is reintroduced into the housing radially on the inside after cooling.

Actuation of the wet clutches can be accomplished hydraulically by means of pistons actuated by means of pressure chamber, that is to say moved axially, which each press a clutch pack of a wet clutch into fixed contact with the housing and thereby form a frictional connection between the input and the output part of the wet clutch, the pressure chamber being supplied with pressure by a pump, by way of a pressurized pressure medium, after the switching of hydraulic valves controlled by a control unit. As an alternative, the pistons or corresponding actuating components can be actuated mechanically by way of lever devices, which are actuated by actuators, such as electric motors controlled by a control unit, preferably arranged outside the housing.

The centrifugal pendulum can be adapted for use in the housing subject to the effect of the fluid. For this purpose, the vibration behavior of the centrifugal pendulum is advantageously designed for an order of the internal combustion engine. For example, the centrifugal pendulum in the case of a four stroke internal combustion engine with four cylinders is designed for an order greater than 2—preferably 2.05 to 2.2. When using an internal combustion engine with two cylinders, the order of the centrifugal pendulum can be designed in a corresponding manner for an order greater than 1—preferably between 1.02 and 1.20—in the case of an internal combustion engine with three cylinders for an order greater than 1.5—preferably between 1.52 and 1.7—in the case of an internal combustion engine with six cylinders for an order greater than 3—preferably between 3.02 and 3.2— and, in the case of an internal combustion engine with eight cylinders, for an order greater than 4—preferably between 4.02 and 4.2.

Figure 2:
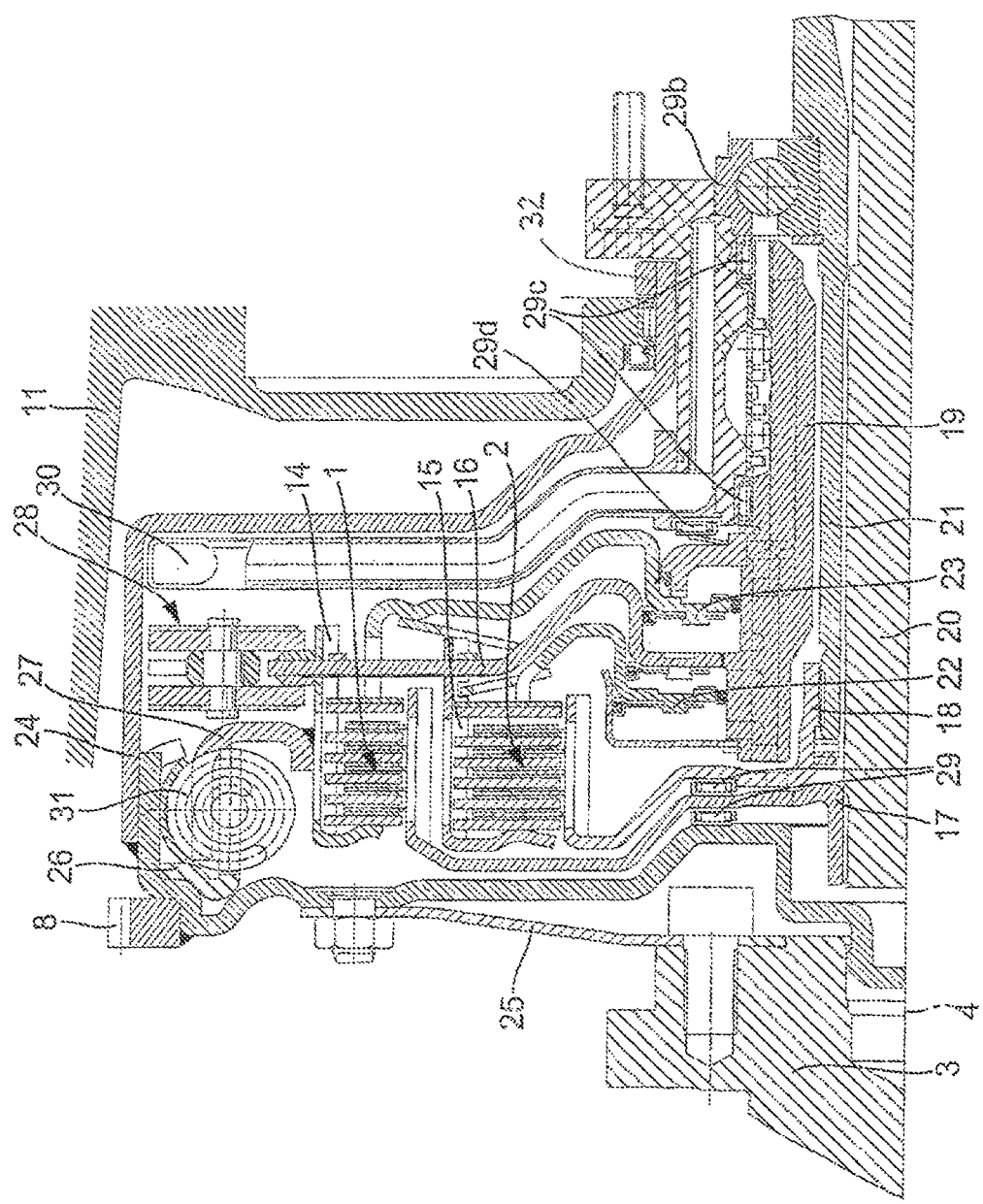
Figure 3:
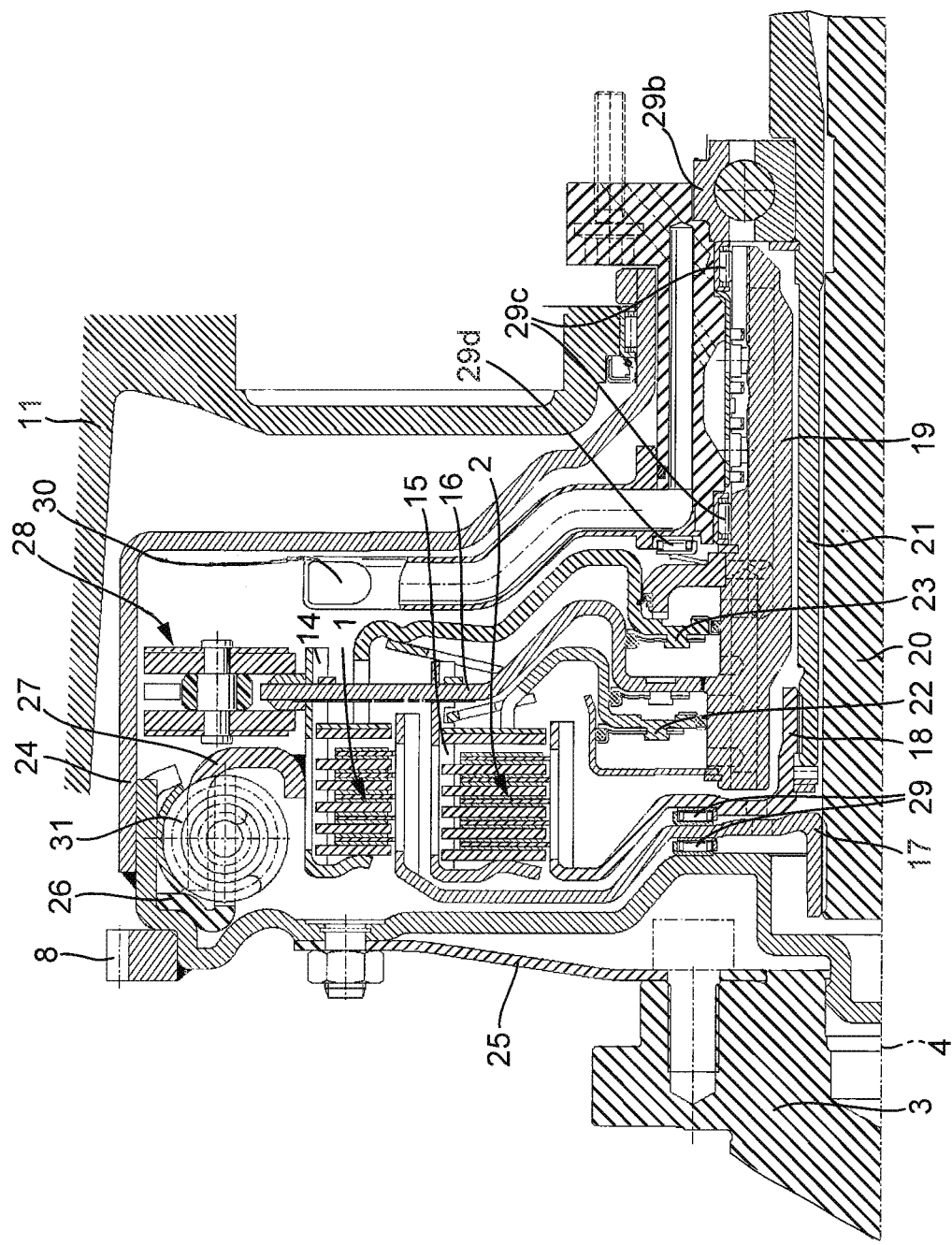

The invention is explained in greater detail with reference to FIGS. 1 and 2, in which:

FIG. 1 shows a dual clutch with a two-stage torsional vibration damper according to the prior art, FIG. 2 shows a dual clutch according to the invention with a torsional vibration damper arranged radially on the outside of the wet clutches, axially adjacent to a centrifugal pendulum, FIG. 3 shows another embodiment according to the invention of a dual clutch with a torsional vibration damper arranged radially on the outside of the wet clutches, axially adjacent to a centrifugal pendulum.

FIG. 1 shows a dual clutch with two wet clutches 1, 2, which are arranged radially one above the other, and a torsional vibration damper 7, which is mounted in a rotationally fixed manner on a crankshaft 3 rotating about an axis 4 of rotation and is formed as a dual mass flywheel with a primary part 5 connected firmly to the crankshaft 3 and with a secondary part 6. The secondary part 6 contains a starter ring gear 8 for starting the internal combustion engine (not shown specifically). The torsional vibration damper 7, which is operated dry and is arranged outside a dividing wall 13 with respect to the wet clutches 1, 2, is of two-stage construction and contains two damper stages connected in series, which are formed from the radially outer damping system 9 and the inner damping system 10.

With the transmission housing 11, the dividing wall 13 forms a wet space for the wet clutches 1, 2. The output part, such as secondary part 6, of the dual mass flywheel is connected in a rotationally engaged manner to the input part 14 of the wet clutches 1, 2 by means of the tooth system 12 formed on a hub of the input part 14. The hub is furthermore sealed off relative to the dividing wall 13 by means of a radial shaft sealing ring at an axial spacing from the tooth system 4. The input part 14 of the wet clutch 1 is connected to the input part 15 of the wet clutch 2 by means of the connecting piece 16.

The output parts 17, 18 of the wet clutches 1, 2 are arranged axially adjacent to one another and to the dividing wall 13 and are supported axially upon one another in a rotatable manner by means of the bearings 29, such as needle bearings. The output parts are each connected in a rotationally fixed manner to a transmission input shaft 20, 21, being toothed for example. The pistons 22, 23, which can be subjected axially to pressure are mounted on the pump hub 19 in such a way that they can be moved axially. To supply pressure to the pressure chambers to move the pistons 22, 23 axially, the pump hub 19 has corresponding pressure feed lines.

In the illustrative embodiment shown in FIG. 1, the dual clutch is supported rotatably on the transmission input shaft 21 by means of the bearings 29a. Bearing 29b, which supports the transmission input shaft 21 on the transmission housing 11 as a fixed bearing, serves as an axial stop.

FIG. 2 shows the arrangement according to the invention of a dual clutch with a torsional vibration damper 31, which is integrated into the housing 24 and hence into the wet space and, in the illustrative embodiment shown, can be of single-stage and, in further illustrative embodiments, also of multi-stage design and is arranged at an axial spacing with respect to the centrifugal pendulum 28 arranged substantially at the same radial level radially on the outside of the wet clutches 1, 2. Here, torsional vibration damper 31 and centrifugal pendulum 28 are arranged substantially within the axial installation space of the wet clutches 1, 2, and it is thus possible, by combining the torsional vibration damper 31 and the centrifugal pendulum 28, to propose a vibration damping system which requires virtually no additional axial installation space. As depicted in the illustrative embodiment shown, the torsional vibration damper 31 is preferably connected in parallel with the centrifugal pendulum 28, as a result of which both vibration damping components act simultaneously on the input parts 14, 15 of the wet clutches 1, 2, thus making it possible, for example, for the torsional vibration damper 31, which covers a wide oscillation angle, to cope with large amplitudes, while the centrifugal pendulum 28 damps smaller amplitudes, possibly with a higher frequency.

The torsional vibration damper 31 is connected directly between the housing 24, which carries the starter ring gear 8, and the input part 14 of wet clutch 1, the input part 26 of the torsional vibration damper 31 being connected firmly, e.g. welded, to the housing 24, and acting upon one end of the energy storage devices, such as arcuate springs, while the output part 27 of the torsional vibration damper 31 acts upon the other end of the energy storage devices and is firmly connected, e.g. welded, to the input part 14.

The centrifugal pendulum 28 is mounted on the outer circumference of the connecting piece 16, which connects the two input parts 14, 15 of the wet clutches 1, 2 to one another, and, in accordance with the vibrations which occur, has on both sides centrifugal masses which can be moved relative to the connecting piece in tracks running in the circumferential direction and the radial direction provided in the connecting piece 16, the direction and length of the tracks being matched together with the centrifugal masses used to the frequency to be damped or to the corresponding frequency range. At the same time, the centrifugal pendulum 28 is matched to the fluid used in the housing. It has proven advantageous if the centrifugal pendulum 28 is designed to damp second- and higher-order vibrations, depending on the order of the internal combustion engine, with a preferred increase in the tolerances of the orders with a lower tolerance limit of 0.02 and an upper tolerance limit of 0.2.

By virtue of the integration of the torsional vibration damper 31 into the housing 24, the latter is attached directly in a rotationally fixed manner to the crankshaft 3 rotating about the axis 4 of rotation by means of an axially flexible flex plate 25. The embodiment of the housing 24 with the flex plate 25 corresponds to the installation situation of a hydrodynamic torque converter. For assembly, the dual clutch is accordingly pushed onto the transmission input shaft and, during the connection of the transmission and the internal combustion engine, the flex plate 25 mounted on the crankshaft 3 is screwed to the housing 24.

For forced circulation of the fluid provided in the housing 24 in order to cool the wet clutches 1, 2, which is heated up in particular by slip in the wet clutches 1, 2, a fixed scoop tube 30 can be provided at an axial spacing with respect to the centrifugal pendulum 28, said tube having, in the region of the outer circumference of the housing 24, an opening which scoops up the fluid, which is rotating owing to the rotation of the housing 24, and carrying the fluid out of the housing 24 and into the transmission sump, for example, by means of a conduit. From the transmission sump, the fluid is fed to the associated actuators by means of a pump in order to actuate the wet clutches 1, 2. Before the fluid is used to cool the wet clutches 1, 2, it can be passed through a cooler and cooled.

Depending on the radial length of the scoop tube 30, the centrifugal pendulum 28 can preferably be operated dry or wet. In the illustrative embodiment shown in FIG. 2, the scoop tube 30 extends as far as the outer circumference of the housing 24 and scoops up the fluid, which collects in the region of the centrifugal pendulum 28 owing to the action of centrifugal force, thereby ensuring that the centrifugal pendulum 28 is left dry. Here, the centrifugal pendulum is designed for dry operation. If the scoop tube is shortened radially as shown in the embodiment of FIG. 3, the fluid collects in the region of the centrifugal pendulum and a wet design—as described above—is chosen. FIG. 3 is a representative illustration of the scoop tube shortened radially relative the centrifugal pendulum and is not meant to show an exact or specific radial length of the scoop tube. After passing through the cooling circuit, the fluid is fed back to the housing radially on the inside. To save axial installation space, the scoop tube 30 can be omitted and the fluid can be transported into the cooling circuit by means of a circulation pump.

As explained with reference to FIG. 1, the wet clutches 1, 2 are actuated by means of the pistons 22, 23, which are arranged in a sealing manner on the pump hub 19 in such a way that they can be moved axially as a function of the actuating pressure. The torque transmitted by the closed or slipping wet clutches 1, 2 is output by means of the output parts 17, 18 of the wet clutches 1, 2, which are connected in a rotationally fixed manner to the transmission input shafts 20, 21.

The rotatable support of the output parts 17, 18 one upon the other and relative to the housing 24, of the transmission input shaft 21 on the transmission housing 11, and of the scoop tube 30 on the pump hub 19 is accomplished by means of the bearings 29.

In a manner known per se from torque converters, the housing 24 has a connecting element 32 which projects from the transmission housing 11 and, by means of a tooth system, can drive a pump which, if appropriate with the addition of a pressure reservoir for example, can actuate the wet clutches 1, 2, actuators such as shift cylinders for the transmission, such as a dual clutch transmission, and/or, where the scoop tube 30 is omitted, can bring about the circulation of the fluid in the housing. In this case, the pump can be arranged in the subsequent transmission, into which the connecting element 32 engages, and can be designed as a gear pump or a radial piston pump, for example.

The dual clutch in FIG. 2 is supported on the transmission housing 11 by means of the bearings 29*c*. The axial stop for the dual clutch is provided by means of the bearing 29*d*.

LIST OF REFERENCE SIGNS

1 Wet clutch
2 Wet clutch
3 Crankshaft
4 Axis of rotation
5 Primary part
6 Secondary part
7 Torsional vibration damper
8 Starter ring gear
9 Outer damping system
10 Inner damping system
11 Transmission housing
12 Tooth system
13 Dividing wall
14 Input part of a wet clutch
15 Input part of a wet clutch
16 Connecting piece
17 Output part of a wet clutch
18 Output part of a wet clutch
19 Pump hub
20 Transmission input shaft
21 Transmission input shaft
22 Piston
23 Piston
24 Housing
25 Flex plate
26 Input part
27 Output part
28 Centrifugal pendulum
29 Bearing
29*a* Bearing
29*b* Bearing
29*c* Bearing
29*d* Bearing
30 Scoop tube
31 Torsional vibration damper
32 Connecting element

The invention claimed is:

1. A dual clutch for motor vehicles, comprising:
an oiltight housing;
the housing being connected in a rotationally fixed manner to a crankshaft of an internal combustion engine;
a torsional vibration damper, two wet clutches and a centrifugal pendulum are arranged in the housing;
the wet clutches each have an input part and an output part;
a connecting element connects the input parts of the wet clutches to one another;
the output parts of the wet clutches are connected in a rotationally fixed manner to transmission input shafts;
the torsional vibration damper is arranged in a power flow from the housing to the input parts of the wet clutches, an input part of the torsional vibration damper being connected to the housing, and an output part of the torsional vibration damper being connected to the input parts of the wet clutches; and
the centrifugal pendulum is arranged on an outer circumference of the connecting element,
wherein a scoop tube, which conveys a radially outer fluid present in the housing out of the housing, is arranged in the housing and is shortened radially relative to the centrifugal pendulum so that a radial distance of the scoop tube to a center axis of the double clutch is shorter than a radial distance of the centrifugal pendulum to the center axis, whereby the fluid collects in radial region of the centrifugal pendulum, and the centrifugal pendulum is a wet design centrifugal pendulum.

2. The dual clutch as claimed in claim 1, wherein the torsional vibration damper and the centrifugal pendulum are arranged substantially on a same diameter and axially in series.

3. The dual clutch as claimed in claim 1, wherein the torsional vibration damper is fitted with arcuate springs.

4. The dual clutch as claimed in claim 3, wherein the arcuate springs slide in a sliding shell.

5. The dual clutch as claimed in claim 1, wherein the connecting element drives a pump in a transmission arranged axially in series.

6. The dual clutch as claimed in claim 1, wherein the centrifugal pendulum is designed for an order greater than an order of the internal combustion engine driving the centrifugal pendulum.

7. The dual clutch as claimed in claim 6, wherein the centrifugal pendulum is designed for an order which is 0.02 to 0.2 times higher than the order of the internal combustion engine.

8. The dual clutch as claimed in claim 1, wherein the fluid exchange in the housing is accomplished by means of a pump.

9. The dual clutch as claimed in claim 1, wherein at least one wet clutch of the two wet clutches is closed by means of pistons.

10. The dual clutch as claimed in claim 1, wherein at least one wet clutch of the two wet clutches is closed by means of a lever actuation mechanism.

11. A dual clutch for motor vehicles, comprising:
   an oiltight housing;
   the housing being connected in a rotationally fixed manner to a crankshaft of an internal combustion engine;
   a torsional vibration damper, two wet clutches and a centrifugal pendulum are arranged in the housing;
   a scoop tube, which conveys a radially outer fluid present in the housing out of the housing, arranged in the housing, wherein the at least one scoop tube is shortened radially relative to the centrifugal clutch so that a radial distance of the scoop tube to a center axis of the double clutch is shorter than a radial distance of the centrifugal pendulum to the center axis whereby the fluid collects in a radial region of the centrifugal pendulum, and the centrifugal pendulum is a wet design centrifugal pendulum;
   the wet clutches each have an input part and an output part;
   the input parts of the wet clutches are connected to one another;
   the output parts of the wet clutches are connected in a rotationally fixed manner to transmission input shafts;
   the torsional vibration damper is arranged in a power flow from the housing to the input parts of the wet clutches, an input part of the torsional vibration damper being connected to the housing, and an output part of the torsional vibration damper being connected to the input parts of the wet clutches; and
   the centrifugal pendulum is arranged on one of the input parts of the wet clutches.

* * * * *